Aug. 3, 1954 — F. H. MUELLER — 2,685,461
PIPE COUPLING
Filed Sept. 22, 1949 — 2 Sheets-Sheet 1
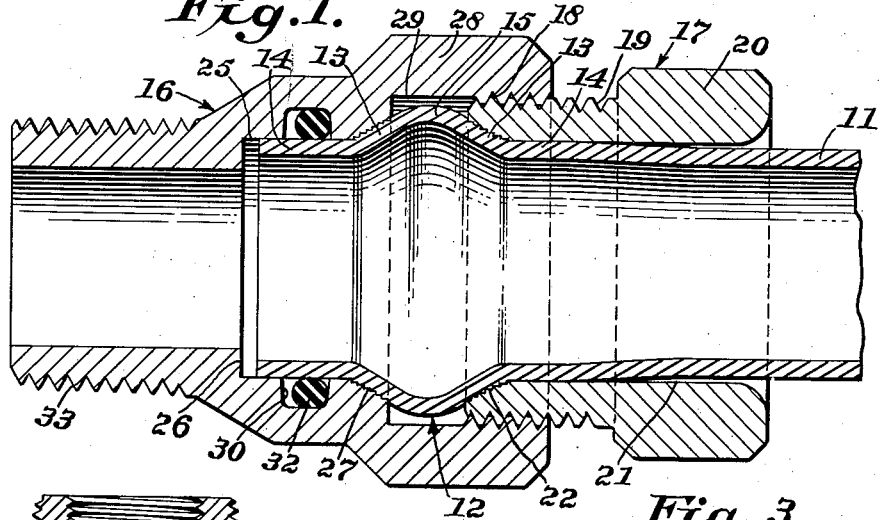
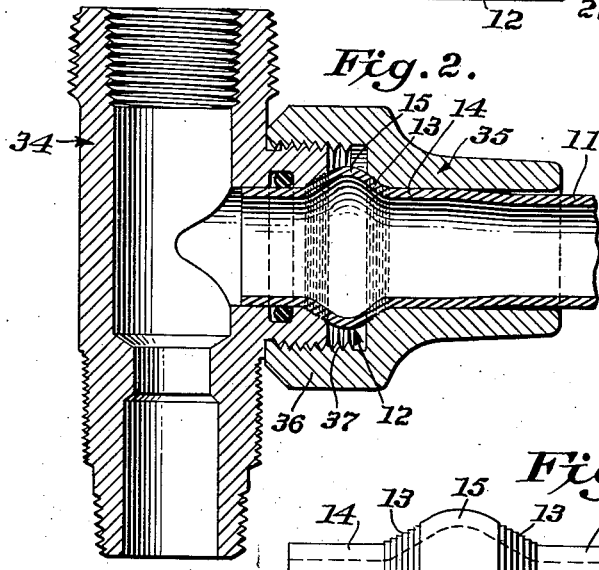
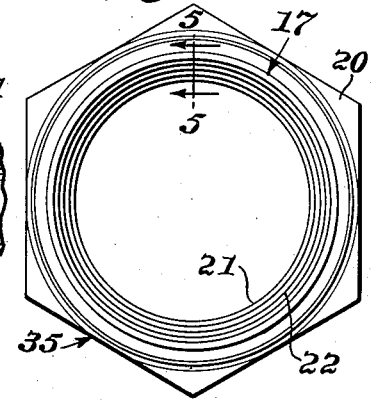
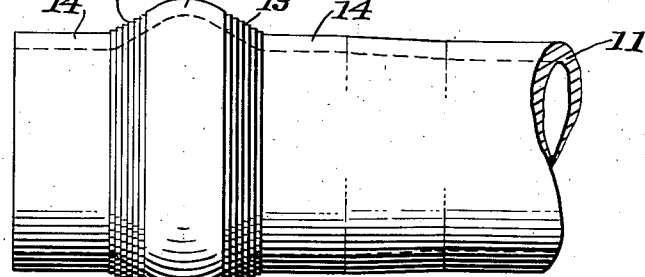
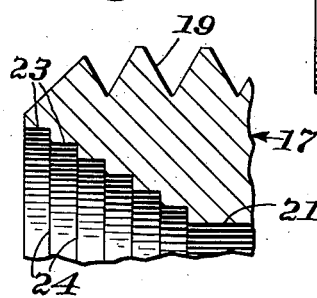
INVENTOR:
Frank H. Mueller,
BY Cushman, Darby & Cushman
ATTORNEYS

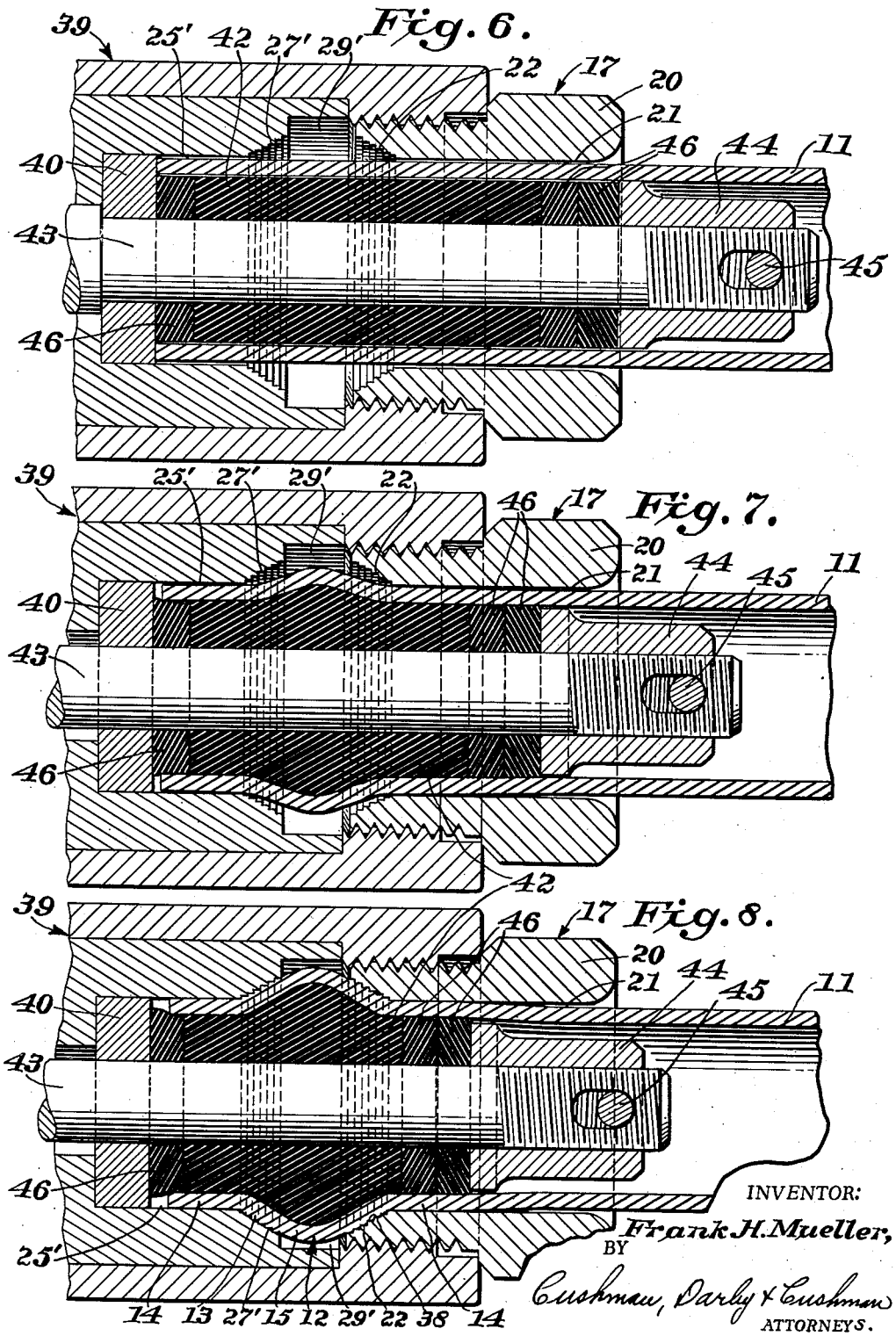

Patented Aug. 3, 1954

2,685,461

UNITED STATES PATENT OFFICE 2,685,461

PIPE COUPLING

Frank H. Mueller, Decatur, Ill., assignor to Mueller Co., Decatur, Ill., a corporation of Illinois Application September 22, 1949, Serial No. 117,147

2 Claims. (Cl. 285—124)

This invention relates to coupling structure, particularly adapted for use with smooth walled tubes, and to a method of making couplings. The invention further encompasses fittings adapted for use in the coupling structure and method.

Smooth walled tubes of copper and other ductile metals are widely employed in fluid transmission systems, especially for the distribution of water and gas. Couplings are commonly made to such tubes by soldering, a process necessitating the use of a blow torch and special technique. Soldered joints are further not entirely satisfactory, since they may fail in case of fire, and the silver solders widely used are prone to anneal and form weak spots, apt to fail under vibration and similar stresses.

Numerous types of couplings involving tube flares and beads are known, but are not generally satisfactory in all applications because of liability of the tube to pull out of the coupling under axial stress, lack of ability to maintain a tight seal under continued vibration, inherent thinning or other weakening of the tube wall, the necessity for expensive, bulky equipment to make the seal, or a combination of the foregoing disadvantages and others not listed.

It is an object of the present invention, therefore, to provide a novel coupling structure involving beaded, smooth walled tubes, adapted to effect a permanently fluid-tight multiple seal therewith, proof against vibration, expansion and contraction, axial pull, high pressures and the like.

It is a further object of this invention to provide a self-locking, self-adjusting coupling structure.

A further object is to provide a method for making a coupling in which the foregoing objects are inherently attained.

Another object is to provide a method for making a coupling involving a bead on a smooth walled tube, wherein the tube is not weakened by thinning the walls thereof or otherwise, but on the contrary is substantially hardened and strengthened.

Yet another object is to provide a coupling fitting adapted for employment in the coupling and method.

Other objects will be in part obvious and in part pointed out hereinafter.

The invention and the novel features thereof may best be made clear from the following description and the accompanying drawings, in which:

Figure 1 is a sectional view of an exemplary completed coupling according to the present invention;

Figure 2 is a sectional view of another completed coupling, composed of different fittings from those of the coupling of Figure 1;

Figure 3 is an end elevation of the right hand fitting of Figure 1, looking toward the annularly serrated, inclined, bead-engaging surface thereof;

Figure 4 is an elevational view of the tube end portion included in the couplings of Figures 1 and 2, with the coupling fittings removed;

Figure 5 is an enlarged, fragmental detail view taken on the line 5—5 of Figure 3, showing details of the serrated bead-engaging surface, and Figures 6 to 8 are a series of sectional views progressively showing successive stages in the formation of the coupling.

Referring to the drawings in detail, in Figure 1 is shown an exemplary embodiment of the present invention including a smooth walled tube 11 provided with a bead indicated generally as 12 adjacent the end thereof. The bead 12 comprises inclined side portions 13 flaring outwardly from the adjoining tube portions 14, and a rounded bead portion 15 intermediate the side portions. The side portions 13 are desirably conical in form, and diverge from the axis of tube 11 preferably at an angle of about 30°, and the bead portion 15 is desirably rounded with a small radius, ¼ inch being suitable for common sizes of copper tubing, for example. Tube 11 is preferably composed of a ductile metal, such as copper, aluminum, soft steel, or the like.

Enclosing tube 11 and the bead 12 thereof are a pair of coupling fittings 16 and 17, fitting 16 being provided with the internally threaded surface 18 and fitting 17 with the externally threaded surface 19, by which the fittings are threadably engaged. Fitting 17, in the example shown, is provided with an enlarged portion 20 adapted externally for the reception of tools, and a bore 21 therethrough, the bore terminating at the inner end of the fitting in the outwardly flaring serrated surface 22. As best shown in Figure 5, the serrated surface comprises a plurality of annular serrations 23 disposed in planes normal to the axis of bore 21, the serrations defining a plurality of annular knife edges 24 therebetween, also normal to the bore axis. The diameter of bore 21, it will be noted, is slightly larger than the normal external diameter of tube 11, the tube portion 14, however, being expanded into tight fitting relationship with the fitting.

In fitting 16 is provided bore 25, coaxial, when the fittings are engaged, with the bore 21 of fitting 17. Bore 25 at its outer end terminates in a shoulder 26, and at its inner end in the outwardly flaring serrated surface 27, similar in all respects to the surface 22, except oppositely disposed. Inwardly of surface 27, fitting 16 is formed into the enlarged portion 28, enclosing a recess 29, of comparatively large diameter relative to the surfaces 22 and 27. Recess 29, it will be noted, is positioned and adapted to enclose the rounded bead portion 15 of bead 12, without contact therewith. If desired in very high pressure applications, bore 25 may be provided with a groove 30 spaced from surface 27, adapted for the reception of an O-ring 32 of the well known type, as an additional seal. Outwardly of shoulder 26, the fitting 15 is formed into the externally threaded extension 33, adapted to engage a threaded pipe, fitting or similar element.

The coupling shown in Figure 2 is similar in essential respects to that of Figure 1, comprising, however, fittings 34 and 35 of different form from that of fittings 16 and 17. In this example, fitting 34 is in the form of a T, and fitting 35 differs from fitting 17 in that the enlarged portion 36 is disposed at the inner end of the fitting, and encloses the recess 37, adapted to contain the rounded bead portion 15 of the tube. It will be evident, then, that the fittings employed in the coupling may be of any ordinary form, provided that each comprises a serrated surface as defined above, flaring outwardly from a bore, and that engagement of the fittings aligns said bores and disposes said surfaces in spaced, opposed relationship, the fittings also defining intermediate said surfaces an enlarged recess.

As shown in Figure 4, the bead side portions 13 conform generally to the serrated surfaces of the coupling fittings, and interfit therewith, at least to a partial extent. Stated otherwise, the side portions 13 comprise annular interfitting indentations 38, conforming in depth partially or fully to the serrations 23 of the inclined surfaces.

One manner of forming the coupling of Figure 1 is sequentially illustrated in Figures 6 to 8, inclusive. As there shown, the fitting 17 is threadably engaged to a suitable forming member indicated generally as 39, said forming member comprising a bore 25', serrated surface 27' and recess 29' in all respects conforming to the bore 25, serrated surface 27 and recess 29 of the fitting 16 to be employed in the final coupling. The forming member further comprises a stop 40, suitably spaced from surface 27'. As shown in Figure 6, the end portion of tube 11 is inserted into the assembled fitting and forming member, with its end abutting the stop 40.

With the elements described so assembled, tube 11 may be expanded into the cavity formed by the opposed serrated surfaces 27' and 22 and the intermediate recess 29', and the side portions 14 into close fitting relationship with bores 25' and 21 adjacent the cavity. The expansion is desirably effected by fluid pressure exerted interiorly of the tube, and may conveniently be accomplished by the compression of a resilient member therein, such as the rubber sleeve 42. In the expansion of the tube and forming of the bead, it will be noted, fitting 17 functions as one forming member and member 39 as the complementary forming member.

In the exemplary embodiment shown, sleeve 42 is supported by rod 43, associated with forming member 39 in any suitable manner and slidable axially relative thereto. A collar 44 is threadably engaged to the end of rod 43 and suitably locked thereto, as by pin 45. One or more hard rubber washers 46 enclose rod 43 on each side of the rubber sleeve, separating the sleeve from collar 44 and stop 40, for a purpose presently apparent. Movement of the rod and associated collar to the left as shown, relative to the forming member 39 and stop 40, it will be readily understood, is effective to compress the washers 46 and sleeve 42 between the collar and stop, causing them to expand laterally, exerting fluid pressure outwardly substantially equally in all directions. Sleeve 42, it will be noted, is of substantially greater length than the cavity defined by the forming members, and is disposed to extend across the cavity and for a considerable distance on each side thereof, for reasons presently apparent.

Figure 7 illustrates an intermediate stage of the tube expansion step. Rod 43 has been relatively displaced to the left, as shown, causing the sleeve and washers to expand laterally, whereby the tube end portion is expanded outwardly toward the surrounding bore walls, and where not so confined, partially expanded into bead form within the aforesaid cavity. As the relative displacement or rod 43 continues to its final position, the outward expansion of the tube end portion proceeds, eventually attaining the final form shown in Figure 8.

In this figure, it will be seen that the bead side portions 13 have been fully formed in annular conformity with the inclined surfaces 27' and 22, and have been pressed thereagainst with sufficient force to impress, at least partially, the bead side portions 13 into the serrations 23 of the inclined surfaces, whereby the indentations 38 corresponding to the serrations are formed in the tube bead side portions. The outward flare of the surfaces 27' and 22 relative to the bore axes must necessarily conform to the desired inclination of the bead side portions in the finished coupling, since the surfaces act as dies in forming the side portions of the bead. The preferred inclination, as previously stated, is about 30°.

Simultaneously, the central bead portion 15 has been expanded outwardly into rounded form as shown, the depth of recess 29' being properly correlated with the spacing between surfaces 27' and 22 so as not to restrain the central bead portion during its formation. As previously indicated, the spacing between the inclined surfaces is desirably such as to effect a central bead portion rounded with a radius of about ¼ inch.

The tube portions 14 adjoining the bead so formed have also been expanded by the sleeve and washers, into close fitting relationship with bores 25' and 21, for a substantial distance on each side of the bead. The hard rubber washers 46 are sufficiently rigid so as not to flow under the pressures of the compression step, but are sufficiently compressible to expand moderately thereunder and assist thereby in the expansion of side portions 14, being effective, moreover, to obviate flow of the readily flowable sleeve between the periphery of the washers and the surrounding tube walls.

The action of a rubber element as an expanding medium is highly desirable, in that the compressed sleeve or similar element frictionally engages the surrounding the tube wall, and draws the tube inwardly as the bead 12 is formed. It will be noted from a comparison of Figures 6, 7 and 8 that the end of tube 11 is progressively drawn away from stop 40 as the expansion proceeds. Similarly, the tube on the other side of the bead is also drawn inwardly thereinto as the bead is formed. This action effects a bead of substantially the same wall thickness as the remainder of the tube, and avoids thinning or otherwise weakening the tube wall at any portion thereof.

The expansion of the tube end portion, it will be further recognized, results in work-hardening the tube wall so affected to a considerable degree, whereby the beaded portion and the adjoining areas are substantially strengthened and hardened. Hard drawn copper tubing is favored for many applications because of being lighter than soft tubing of the same strength, and consequently less expensive. Hard drawn copper tubing may be beaded and formed by the method above described, by preliminarily annealing the tube end. This may be conveniently accomplished by uniformly heating the tube end with a blow torch or suitable electric heater, and then permitting the tube end to cool. Upon the expansion of the tube end in the formation of the coupling, the tube is work-hardened and substantially restored to its original strength and hardness. In this manner the method may be adapted for use with hard drawn tubing, with no resultant loss of strength of the tubing, and in some cases with an actual increase in the final hardness of the tube end.

While the expansion of a rubber element has been disclosed as one manner of expanding the tube within the forming members, it will be recognized that the tube may be otherwise expanded if desired, for example, hydraulically. Similarly, a rubber element may be employed otherwise than as in the example set forth.

When the expansion step has been completed, the forming member is removed. In the example shown, rod 43 may be permitted to return to its original extended position, by moving to the right relatively to forming member 39 and its stop 40, and the entire assembly then disengaged from fitting 17 and removed. Upon sliding fitting 17 backwardly away from the bead, the formed tube end will appear as in Figure 4. Fitting 17 remains on the tube, and is restrained from displacement over the end thereof by the bead. A complementary fitting, such as fitting 16, may then be positioned over the end of the tube and engaged to fitting 17, as shown in Figure 1. The complementary fitting 16 or equivalent fitting of varying form is constructed with its bore 25, serrated surface 27 and recess 29 conforming as nearly as possible to the bore 25′, surface 27′ and recess 29′ of the forming member 39 employed in the expanding step, so that the fitting 16 will closely fit the contained tube portion 14, and the serrations 23 of its surface 27 will exactly fit the corresponding indentations 38 in the tube bead. A very close fit between bore 25 and the contained side portion 14 is possible, since the outer surface of the side portion is forced during the forming step into perfect round, irrespective of any variations out of round and variations in wall thickness originally present in the tube. The fitting 17, having been employed as one of the forming members in the expanding step, will, of course, fit exactly its side of the bead and its contained tube portion. The exact fit attained in this manner greatly contributes to the manifold advantages of this invention.

If desired, and especially where the fitting to be employed over the end of the tube is a straight-through fitting such as fitting 16, both final coupling fittings may be employed as forming members, thus insuring perfect fit of both fittings on the formed bead and the adjoining tube portions. In the exemplary coupling of Figure 1, for example, suitable means for expanding the tube end, which may resemble generally that described in connection with Figures 6 to 8, may be readily inserted into the tube through extension 33 of fitting 16, and the tube expanded as previously described or in similar manner within the fittings 16 and 17. In so doing, the shoulder 26 may be employed to properly position the end of the tube before the expanding operation, and the externally threaded extension 33 of fitting 16 may be employed to engage and align the expanding mechanism. The tube end having been expanded, the expanding means may be removed, and the coupling is completed and ready for use.

The expansion of the tube and formation of the coupling may readily be accomplished on the job, as required, with easily portable equipment, employing in each coupling the particular fittings best adapted for the individual purpose of the coupling.

The coupling fittings to be employed being engaged on the beaded tube end in either manner above described, the coupling may be tightened by moving the fittings inwardly relative to each other, in the exemplary embodiment by rotating one fitting relative to the other, thereby causing the serrated surfaces of the fittings to press inwardly against the indented side portions of the tube bead. By reason of the indented configuration of the bead side portions and the corresponding serrated configuration of the fitting inclined surfaces, the effect of this inward displacement will be to compress the central rounded bead portion 15, after the manner of a U-shaped spring.

The spring compression of the bead portion 15 constitutes an outstanding feature of the present invention. An immediate effect of the compression is to distort the bead under axial stress into perfect alignment with the serrated surfaces, thereby insuring that each serration thereof is in exact and full sealing relationship with its corresponding bead indentation. Further, it will be recognized, the compressed bead portion continually exerts an outward force against the serrated surfaces of the coupling fittings, which pressure not only maintains a perfect multiple seal at all times, but is effective also to prevent inadvertent rotation and backing away of either fitting, due to vibration or other causes. Stated otherwise, the frictional engagement of the fitting surfaces by the compressed tube bead is adequate under all circumstances normally encountered to lock the fittings in coupling relationship.

This effect is further enhanced by the expanded tube portions 14 adjoining the bead, which fit tightly within the bores and prevent lateral movement of the tube relative to the coupling fittings. Vibration and other forces exerted on the tube, then, are transmitted by tube portions 14 to the coupling fittings through the bore walls, and do not result in displacement of the bead side portions 13 relative to the fitting serrated surfaces, which might disturb the seals thereof.

Further, due to the compression of bead portion 15 and its continually exerted outward pressure, variations in dimensions of the fittings and tube, due, for example, to expansion and contraction resulting from temperature changes, do not adversely affect the coupling seals, the spring action of the bead portion functioning to continually compensate for all such variations.

When the coupling is finally assembled and tightened, each of the serrations 23 functions in cooperation with the corresponding tube indentation 38 as an individual knife-edge, metal-to-metal seal, whereby a highly effective multiple seal on each side of the tube bead is attained, proof against leakage under substantially all conditions. The coupling is especially adapted to withstand axial force tending to pull the tube out of the coupling. In pulling tests, it has been found that the tube will almost invariably separate at some point outside the coupling, evidencing the outstanding strength thereof.

The number of serrations formed in the fitting inclined surfaces is not critical, five to seven ordinarily being entirely satisfactory. Nor is the configuration of the serrations critical, so long as the edges defined thereby lie in planes normal to the tube and bore axes. While the serrations shown in Figure 5 are most easily machined, it will be recognized that they may take other forms, if desired.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. A coupling for ductile tubes comprising: a pair of threadedly-engaged fittings having spaced aligned bores; a frusto-conical surface in each of said fittings flaring outwardly from the corresponding bore, said surfaces being disposed in spaced opposed relation and said fittings defining an annular recess intermediate said surfaces of larger diameter than the major diameters of said surfaces; means defining a plurality of annular serrations in each of said surfaces of sharp-edge stepped configuration in radial section; a ductile tube of smaller exterior diameter than the diameter of said bores disposed within said bores and having radially-enlarged sections of appreciable axial extent in tight-fitting relationship with the walls of said bores adjacent said surfaces, said tube extending outwardly beyond one of said fittings and the bore of said one fitting being longer than the corresponding enlarged section of said tube, the tube section between said bores being in outwardly-rounded bead form spaced from the walls of said recess and having exterior surfaces tightly engaged with and complementary to said fitting surfaces and said serrations thereof.

2. The structure defined in claim 1 wherein the fitting surfaces diverge from the bores at an angle of the order of 30°.

References Cited in the file of this patent

UNITED STATES PATENTS

| Number | Name | Date |
|---|---|---|
| 549,569 | House | Nov. 12, 1895 |
| 635,636 | Bailey | Oct. 24, 1899 |
| 683,482 | Neumeyer | Oct. 1, 1901 |
| 1,716,429 | Davies | June 11, 1929 |
| 1,794,849 | Hagstedt | Mar. 3, 1931 |
| 1,858,136 | Brenner | May 10, 1932 |
| 1,927,464 | McIntosh | Sept. 19, 1933 |
| 1,982,850 | Banks | Dec. 4, 1934 |
| 2,269,629 | Kreidel | Jan. 13, 1942 |
| 2,306,702 | Koerner | Dec. 29, 1942 |
| 2,310,944 | Douglass | Feb. 16, 1943 |
| 2,333,909 | Williams | Nov. 9, 1943 |
| 2,335,414 | Hinricks | Nov. 30, 1943 |
| 2,428,077 | Herold | Sept. 30, 1947 |
| 2,459,956 | Muller | Jan. 25, 1949 |
| 2,463,883 | Kinsey | Mar. 8, 1949 |
| 2,469,851 | Stecher et al. | May 10, 1949 |
| 2,477,677 | Woodling | Aug. 2, 1949 |

FOREIGN PATENTS

| Number | Country | Date |
|---|---|---|
| 393,419 | Great Britain | June 8, 1933 |
| 563,581 | Great Britain | Aug. 21, 1944 |